June 2, 1964     P. E. BAKER ETAL     3,135,912

NUCLEAR MAGNETISM WELL LOGGING

Filed Oct. 11, 1954     3 Sheets-Sheet 1

INVENTORS
PAUL E. BAKER
STANLEY B. JONES
DELMAR O. SEEVERS

BY
ATTORNEYS

United States Patent Office 3,135,912
Patented June 2, 1964

3,135,912
NUCLEAR MAGNETISM WELL LOGGING
Paul E. Baker, Anaheim, Stanley B. Jones, Whittier, and Delmar O. Seevers, Fullerton, Calif., assignors to California Research Corporation, San Francisco, Calif., a corporation of Delaware
Filed Oct. 11, 1954, Ser. No. 461,339
5 Claims. (Cl. 324—.5)

Our invention relates to a method and apparatus for differentiating substances by their nuclear magnetic induction properties, and particularly to a logging apparatus for locating hydrogenous fluids and distinguishing between water and oil in the formation around a bore hole. This application is a continuation-in-part of our copending application Serial No. 337,384, filed February 17, 1953, for "Analytical Device."

The problem of distinguishing water and oil within the earth is an important one in oil technology. Once an oil well is drilled in a place where oil is expected to be found, there remains the problem of determining at what depth the well reaches an oil-containing formation. According to the prior art of which we are aware, a well is usually drilled to a depth of a few thousand feet and an electric log is made of the well. Such a log measures resistivity and self-potential within the formation at the sides of the well. The most common liquid in the formations around a well bore is brine, which has a low resistivity compared to oil. An electric log is therefore interpreted on the assumption that a high resistivity indication at a known level within the well indicates a minimum of salt water. If a strong self-potential also exists at that level, it is assumed that the formation is permeable and that there is a possibility of an accumulation of producible oil at that level. Accordingly, if geological data gained from an examination of the chips which come to the surface in the process of drilling the well do not negate the presence of oil at that point in the well, it is assumed, in the absence of other data, that oil has been found, and an effort is made to produce oil at this level. However, it is well known that variations in permeability of a formation, the salinity of the formation water and geology of the formations may radically affect resistivity and self-potential. It is apparent, then, that electric logs are ambiguous since they measure only electrical characteristics of the formations through which the well has been drilled. These characteristics are not a necessary concomitant of oil.

In order to explain our invention, it is necessary to set forth in a brief fashion the elementary nuclear theory on which our method is based. An atom consists of a small, heavy, positively charged center called the nucleus, surrounded by a relatively extensive diffuse cloud of electrons. The nucleus carries a positive charge equal to the negative charge of the external electrons and has a spin or angular momentum which varies with the nature of the nucleus. The hydrogen nucleus, for example, has an angular momentum, $$a = \frac{\frac{1}{2}h}{2\pi}$$

where $h$ is Planck's constant. In this sense, the nucleus, which in the case of the hydrogen atom is a proton, acts like a small gyroscope. The proton has a characteristic magnetic moment, $\mu$, which is a measure of the proton's tendency to line up with a magnetic field. While the nucleus of the hydrogen atom consists of a single proton, nuclei of other atoms contain more than one proton, together with varied numbers of neutrons. Some nuclei do not have a spin, and hence a magnetic moment, although they do contain varying numbers of protons. Our invention involves only those nuclei possessing magnetic moments, and especially protons.

In substances on which our invention is to be employed, the nucleus is not affected solely by an external magnetic field. Rather, the total field which acts on a nucleus is the sum of the external fields plus a local field peculiar to the material under study. The local field is affected by the proximity of other nuclei and electrons. The effective magnetic field acting on one nucleus is different from that acting on other nuclei in the same sample. Consequences of these facts will be discussed more fully in later portions of this application.

In the absence of an external magnetic field, the nuclei of any sample of material are randomly oriented in space. When an external magnetic field is impressed on the sample, the nuclei are subjected to a torque proportional to their magnetic moments and tend to align themselves with the magnetic field.

According to classical theory, the nuclear precession process may be visualized in the following manner: In the presence of a magnetic field, the nuclei do not merely swing into position with the field but tend to precess around the field. In this, the nuclei resemble a gyroscope which is acted on by the earth's gravitational field. The earth's gravitational field exerts a torque on the gyroscope tending to cause the gyroscope to align itself with the earth's gravitational field. This torque on the gyroscope causes precession about the direction of the earth's gravitational field as the gyroscope seeks a position in the direction of the earth's gravitational field. Analogously, those nuclei which have a spin and associated magnetic moment tend to precess about the direction of the external magnetic field as they seek a position parallel to the field. This precession is in response to the torque exerted on their magnetic moments. The orderly precession of the nuclei is interrupted by thermal agitation and the effect of adjacent precessing nuclei. The effective magnetic field on each nucleus is a combination of the external magnetic field and the resultant magnetic field due to the combined effect of the magnetic fields of adjacent charged particles. The proximity of the charged particles to a given nucleus varies with time and tends to interfere with the precession.

The natural frequency of precession of nuclei within an external magnetic field is determined by the nature of the nuclei and the strength of the magnetic field. This natural frequency is called the Larmor frequency. The Larmor frequency is $$\omega_L = \frac{\mu}{a}H$$

H is the field at the position of the nucleus and is the vector sum of the magnetic field applied externally and the magnetic fields of adjacent charged particles. The ratio of $\mu$ to $a$ is commonly denoted by the symbol, $\gamma$, and is called the gyromagnetic ratio of the particular nucleus in question. $\gamma$, then, determines the precessional frequency of nuclei for a given external magnetic field.

Nuclei precessing about a magnetic field are equivalent in some respects to rotating magnetic dipoles and, as such, are capable of inducing a signal in a coil. Nuclei which are precessing about a magnetic field are, in general, oriented randomly with respect to a predetermined direction perpendicular to the field. Thus, a pickup coil which receives a signal due to the precession of one nucleus receives an equal and opposite signal from some other nucleus. The macroscopic effect is a complete cancelling out of signals from individual nuclei. An adjacent pickup coil can receive no signal from the precessing nuclei unless there is a precessing macroscopic moment.

A number of methods have been found for causing the nuclei to precess in phase to provide a precessing macroscopic moment. One method is disclosed in our invention and will be described later, although our invention is not limited thereto.

In the practice of our invention, a condition of nuclear precession is established in the formation adjacent the bore of a well. A macroscopic precessing moment is produced by a polarizing field. The polarizing field is caused to collapse and the relaxation time of the precessing nuclei is measured as an indication of the nature of the liquids in the formation.

The novel features of our invention are set forth with more particularity in the accompanying claims. The invention itself, however, with respect to the details thereof, together with its additional objects and advantages, may be better understood from the following description of specific embodiments with reference to the accompanying drawings, in which:

Figure 1:
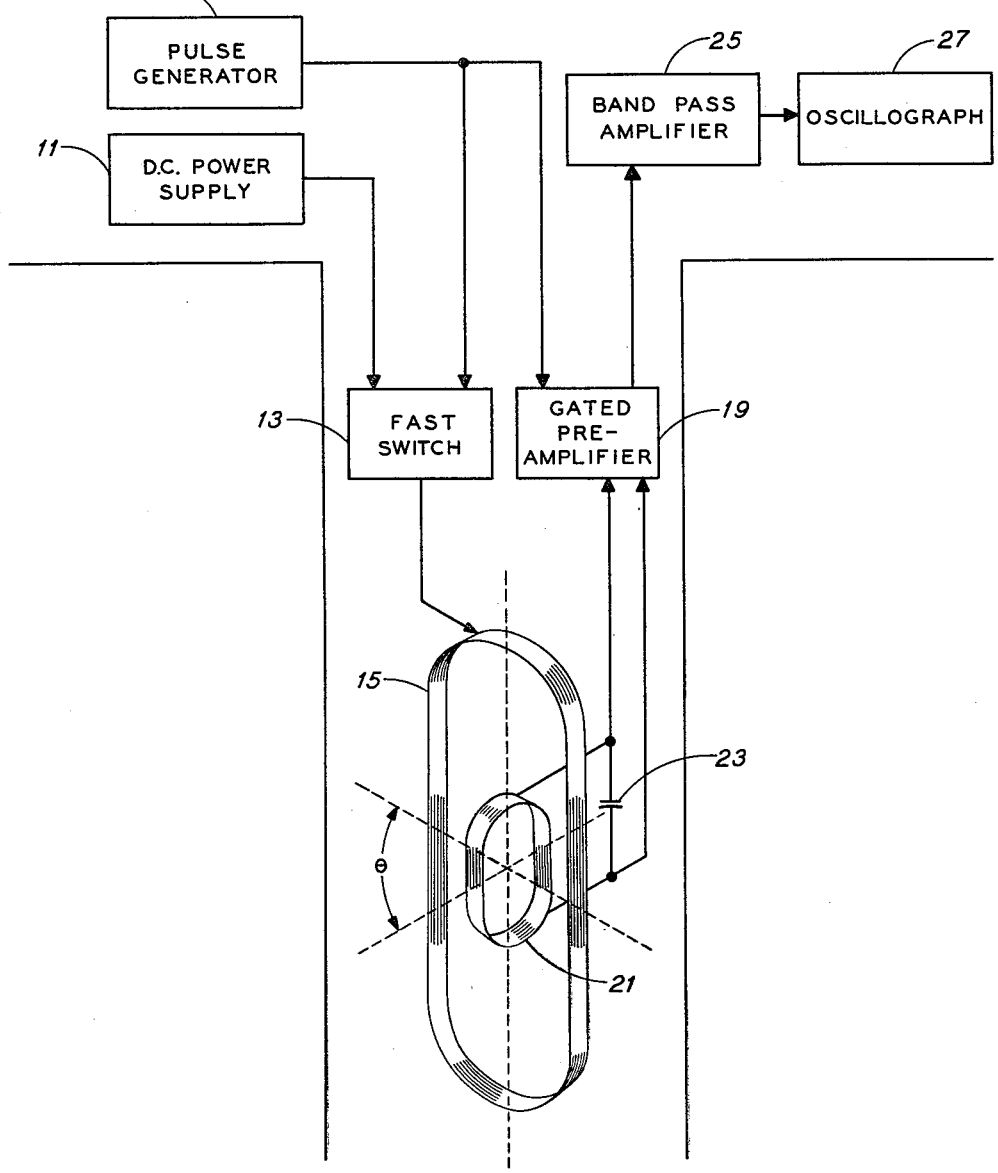
FIG. 1 is a schematic diagram of an exemplary embodiment of a nuclear magnetic induction relaxation time logger according to our invention.

As shown in FIG. 1, the D.C. power supply 11 provides direct current to the polarizing coil 15 through a fast switch 13. A pulse generator 17 controls the fast switch 13 and the gated preamplifier 19. A detector coil 21 is connected in parallel with a capacitor 23 and feeds into the gated preamplifier 19. The preamplifier 19 feeds current through the band-pass amplifier 25 to the oscillograph 27.

The pulse generator 17 generates a negative-voltage square wave. It is adapted to be adjusted so that the duration of the negative pulse and of the interval between pulses from the generator 17 may be varied over a substantial range. The pulse generator is so connected into the preamplifier 19 that it gates the preamplifier 19. The pulse generator 17 also controls the fast switch 13.

Figure 2:
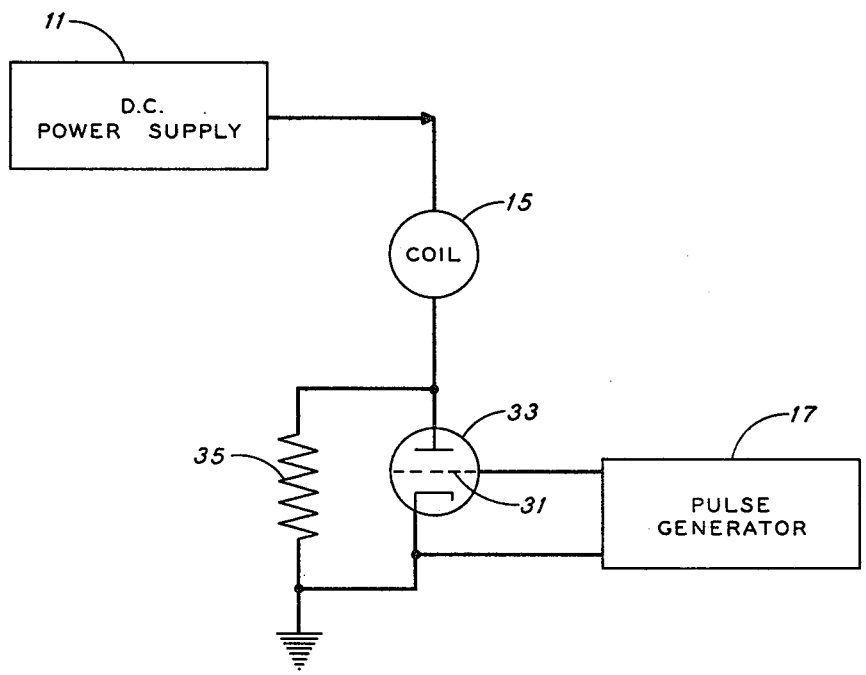
FIG. 2 is a schematic circuit diagram of a suitable fast electrical switch.

Referring to FIG. 2, the pulse generator 17 controls the voltage of the grid 31 of the vacuum tube 33. The D.C. power supply 11 is connected through the coil 15, through resistor 35 and vacuum tube 33 to ground. The resistance of the resistor 35 is sufficiently high that for nuclear polarization purposes it may be regarded as an open circuit. To initiate current flow through the coil 15, the tube 33 is rendered conductive by a change in voltage impressed by the pulse generator 17. A later change in the voltage on the grid 31 renders the vacuum tube 33 non-conductive. The resistor 35, shunting the tube 33, serves to limit the voltage across the tube 33 resulting from the rapid reduction in D.C. current through the inductor 15.

The current through the polarizing coil 15 shown in FIG. 1 sets up in the formation adjacent the well which is being logged a magnetic field which establishes a macroscopic nuclear magnetic moment with a component perpendicular to the earth's magnetic field. If the magnetic field of the coil 15 is removed quickly enough, the macroscopic moment will precess about the earth's magnetic field. It is pertinent to our invention that the polarizing coil is designed to permit extremely rapid decay of the polarizing field as compared to the Larmor period of a proton in the earth's magnetic field.

The gated preamplifier 19 is also controlled by the pulse generator 17 and is gated off until the D.C. polarizing field has reached zero. This is done to prevent the voltages induced in the detector coil by the switching of the polarizing coil from blocking preamplifier 19 and the amplifier 25.

As soon as the D.C. polarizing field of the coil 15 is effectively zero, the nuclear signals are picked up by the tuned detector 21—23, amplified, and recorded on the oscillograph 27. The coil 21 detects the signal from precessing protons in a manner somewhat similar to the action of a transformer secondary. The angle $\theta$ between coil 21 and coil 15 may have an arbitrary value. When it is desired to minimize the signal induced in coil 21 by coil 15, $\theta$ should be equal to 90 degrees. However, the signal induced in coil 21 by oscillations in coil 15 during shut-off of coil 15 can be damped while the preamplifier 19 is gated off. The capacitor 23, in conjunction with coil 27, forms a tuned circuit. The oscillograph may be either a cathode ray oscilloscope, the face of which is photographed in order to record the signal on its face, or the oscillograph may be another type of recording instrument.

It is not necessary that coil 15 and coil 21 be physically separate coils. It is a simple matter for one skilled in the art to use one and the same coil for both polarization and detection purposes.

The operation of the apparatus described with reference to FIG. 1 will now be described. First, it is necessary to define relaxation time and present the scientific basis on which an analysis of the signal output of the above-described apparatus may be made.

When a magnetic field is applied externally to a sample, the rate at which the nuclear magnetic moment reaches an equilibrium value is an exponential function of time donated by $t$ and is characterized by the thermal relaxation time commonly denoted by $T_1$:

$$M = M_1 + (M_t - M_i)(1 - e^{-t/T_1})$$

where M is the nuclear magnetic moment, $M_i$ is the initial moment of the system at the instant the external magnetic field is applied, and $M_t$ is the final equilibrium moment of the system of nuclear magnetic moments. When the nuclei are caused to precess in phase, a net macroscopic precessing nuclear magnetic moment arises. The precessing component of the macroscopic moment is gradually destroyed over a period of time by thermal motion of the nuclear moments and by the interaction of the nuclear magnetic moments among themselves at a rate that is an exponential function of time. The rate is characterized by the relaxation time, T, which is determined both by $T_1$, defined above, and by $T_2$, where $T_2$ characterizes the rate at which the precessing nuclei get out of phase because of the interaction of their nuclear magnetic moments.

$T_1$ and $T_2$ are characteristic of a particular hydrogenous fluid, being determined by viscosity, temperature, paramagnetic impurities, electronic magnetic fields, and interaction of nuclear magnetic moments. In particular, the protons in oil within the formation will have a different relaxation time, T, from that of the protons in water within the formation. A number of characteristic differences between oil and water are either concomitant with this effect or cause a change in the relaxation time. Oil, having a different chemical composition from water, tends to imbue its protons with a somewhat different relaxation time. Oil, having a higher viscosity than water, tends, for this reason, to be characterized by a shorter relaxation time. These considerations are characteristic of differences between oil and water in the pure form. Oil and water within the earth, however, contain a wide assortment of impurities. Paramagnetic impurities within a hydrogenous liquid tend to shorten the relaxation time of the protons therein. A very small quantity of paramagnetic impurity in the liquids has a gross effect on the relaxation time. Thus, the amount of paramagnetic impurity within the formation waters or crude oil may, at times, be the single determinant which determines whether oil or water will have the longer relaxation time.

A number of studies have been made of the variations in the quantity of various impurities in oil and water within the earth. Among the paramagnetic impurities in formation water, iron is usually the principal constituent and substantial amounts of manganese and chromium are common. In oil, vanadium is usually the principal paramagnetic impurity, while iron and nickel are important paramagnetic impurities. Analyses indicate that formation waters may have from less than one part per million paramagnetic impurity to one percent paramagnetic impurity. Oils have been analyzed to have from less than one part per million paramagnetic impurity to 100 parts per million. Paramagnetic impurities of less than 100 parts per million are sufficient to affect strongly the relaxtion time of protons within the oil. A similar effect exists in water. Accordingly, if the formation water in a well which is tested by our nuclear magnetism method has no measurable paramagnetic impurity while the oil within the formation adjacent to the same well has of the order of 100 parts per million, the oil will have a measurably shorter relaxation time. Conversely, if the water has a high concentration of paramagnetic impurities and the oil has less paramagnetic impurity, the protons in the water may have a measurably shorter relaxation time.

Waters from a number of oil fields in widely distributed geographic locations have been tested, and it is often possible before a well log is made to know whether the oil or water will have a greater concentration of paramagnetic impurities. If this difference in the concentration of paramagnetic impurities is great enough, the paramagnetic impurities themselves will determine which material will have the greater relaxation time and a log can be interpreted accordingly. If the concentration of paramagnetic impurity within the well is essentially the same for water and oil, oil will generally have the shorter relaxation time. Thus, on the basis of previous tests, such characteristics of the oil and water are measured in order that the nuclear magnetic log may be interpreted as an indication whether the formation contains oil or water.

Nuclear magnetic resonance measurements may be used to identify and classify formation waters in particular geological zones and formations so that the nuclear magnetic resonance log may be used for correlating geological formations from bore hole to bore hole.

There will be no nuclear magnetic resonance of carbon or oxygen in the formation since the angular momentum and magnetic moment of the nuclei of these two elements is zero. Solid substances not suspended in liquids within the formation will not provide a resonance signal sufficient to interfere with the nuclear resonance signal to which our present invention pertains. In some situations it might be difficult to differentiate oil or water in the drilling mud from that in the formation. Under those circumstances, it is advisable to shorten the relaxation time of protons therein by the introduction of paramagnetic impurity including finely divided ferromagnetic impurities, paramagnetic ions, etc. or by controlling the viscosity, or by other means. Then, the signal from the precessing nuclei of the mud will decay so rapidly that it will be insufficient to interfere with the signal picked up from the precessing nuclei in the formation. Furthermore, the additive may be so chosen that the drilling fluid filtrate remaining after solid substances from the drilling fluid have been deposited at the well face as filter cake has a negligible relaxation time so that nuclear magnetic signals from the zone of formation around the bore hole invaded by filtrate will give rise to signals from only crude oil and water originally in situ. Furthermore, if water-base drilling mud having a continuous water phase is used, the additive can be so chosen that the signal from the crude oil remaining in the invaded zone is not influenced.

Figure 3:
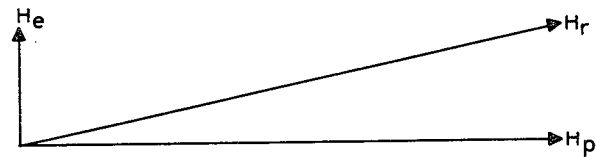
FIG. 3 is a vector diagram of the macroscopic moment, and the fields acting to orient the macroscopic moment.

In the practice of our invention, the earth's magnetic field, $H_e$, is employed as the external magnetic field. Protons within this field have ample time to align themselves in the direction of the field. Accordingly, relaxation time is not of interest in the mechanism of the original alignments. As indicated previously, a slightly larger number of the protons have been aligned in the direction of the field than have been aligned in the direction opposite to the field. If a second D.C. magnetic field is impressed on a sample at an angle with the earth's magnetic field, the resultant magnetic field, $H_r$, is at an angle to both the earth's magnetic field and the second magnetic field, $H_p$, as shown in FIG. 3. Nuclei now tend to align themselves with the resultant magnetic field, $H_r$. The preponderance of nuclear magnetic moments aligned with the field, $H_r$, gives rise to a changed orientation and magnitude of the macroscopic moment. The process of changing the macroscopic moment from the direction, $H_e$, to the direction, $H_r$, is not immediate, but is given by the equation $$M = M_0(1 - e^{-t/T_1}) + M_e$$

where $M$ = the macroscopic moment vector
$M_0$ = a known vector = $\chi(H_r - H_e)$
$t$ = time
$M_e$ = vector component of macroscopic moment in the direction of the earth's field
$T_1$ = thermal relaxation time
$\chi$ = nuclear magnetic susceptibility of the interstitial fluids in the formation surrounding the bore hole.

After an interval of time, the protons reach a steady state where the macroscopic moment in the direction $H_r$ is essentially equal to $M_0$, if, as will be the case in the operation of our invention, $H_p$ is much greater than $H_e$.

Figure 4:
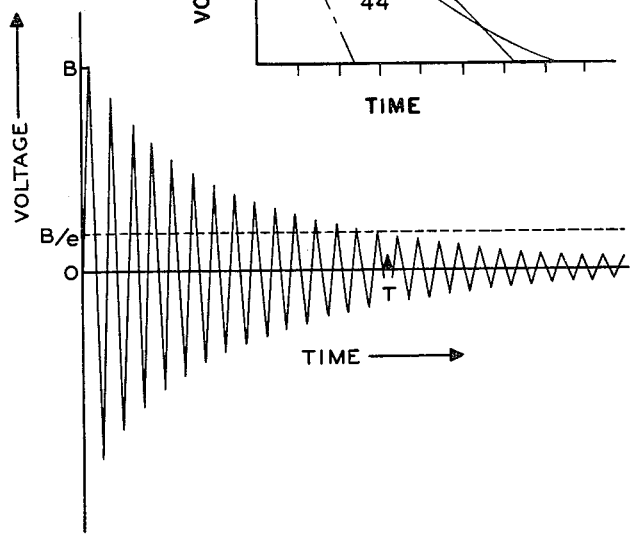
FIG. 4 is a graph of signal voltage versus time for only one hydrogenous fluid.

When the field, $H_p$, is removed, the macroscopic moment tends to align itself with $H_e$ and to be reduced to its original value, $M_e$. If $H_p$ is removed quickly enough (in a time short compared to $1/\omega_L$, where $\omega_L$ is the Larmor frequency of a proton in the earth's magnetic field), then the macroscopic moment will precess about $H_e$. $1/\omega_L$ is about one-fourteenth of a millisecond for protons in $H_e$. $H_p$ may be about ten gauss or more, while $H_e$ is of the order of one-half gauss. In order for precession to occur, $H_p$ must be reduced from ten gauss to much less than one gauss in a time much less than one-fourteenth of a millisecond. The pickup coil 21 in the vicinity of the sample is capable of detecting the precession of the macroscopic moment. As the macroscopic moment precesses, it tends to align itself with $H_e$, and the protons tend to assume a random position with respect to the plane perpendicular to the axis of precession. Due to these effects, the signal received by the pickup coil decreases according to the equation $$V = Be^{-t/T}$$

where $V$ = signal voltage
$B$ = an arbitrary constant
$T$ = relaxation time
$t$ = time FIG. 4 shows a graph of V versus $t$, of which the above equation gives the envelope. As discussed previously, the relaxation time, T, which appears in the above equation, depends on both the thermal relaxation time, $T_1$, and the spin-spin relaxation time, $T_2$, while the relaxation time which controls the time required for the protons to align themselves with the resultant field, $H_r$, is only dependent upon the thermal relaxation time.

The oscillograph records a signal such as that shown in FIG. 4. The record shown in FIG. 4 is interpreted as follows: A measurement is made of the peak-to-peak amplitude of the various waves of oscillation displayed on the oscilloscope face and correlated with the time at which the waves appear. The peak-to-peak amplitudes are then correlated to obtain the constants which appear in the equation $V = Be^{-t/T}$. This equation describes the envelope of decline of the precessional signal derived from the precessing protons. In the equation, the constant T, the relaxation time, is the quantity to be determined. In that an exponential decline will appear as a straight line in a plot of the information it represents if plotted on a semilog graph paper, it is possible to identify the exponential character of the envelope of the precessional signal by plotting the above measured peak-to-peak amplitudes of the various waves on semilog graph paper and to determine the value of the constant T from the slope of the plotted graph.

If the signal on the face of the oscilloscope has an envelope pattern indicating two rates of relaxation and showing the combined effects of two relaxation times present simultaneously for a heterogeneous mixture of two different fluids, the two separate relaxation times may be determined by plotting a representation of the envelope on semilog graph paper. If two relaxation times are present the envelope will not be a simple exponential curve and the plot on semilog graph paper will not be a single straight line. The curve of the plotted line will indicate the effect of precessional signals from the protons of the different fluids within the heterogeneous mixture. Where the relaxation times of these fluids are different the separate relaxation times may be determined from the plotted graph by extrapolating the slope of the later times along the plotted curve back to the ordinate of the graph. The slope of this extrapolated portion of the graph will indicate the relaxation time of the fluid within the mixture having the longer relaxation time. The portion of the graph above the extrapolated portion will be due to the fluid having the shorter relaxation time. After subtracting the relaxation time of the fluid having the longer relaxation period from the plotted curved line, the remaining relaxation time is identifiable with the second fluid and, if desired, the relaxation time of that fluid may be plotted on semilog graph paper where the plot will appear as a straight line.

Figure 5:
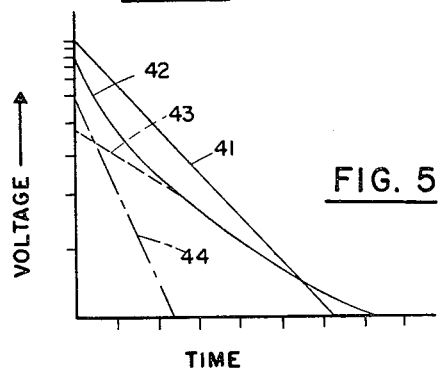
FIG. 5 is a graph of signal voltage variation versus time.

A semilog plot of the envelope of representative precessional signals detected by the pick-up coil is shown in FIG. 5. A straight line plot of relaxation signals is illustrated by line 41. A curved plot of relaxation signals is illustrated by line 42 with the extrapolation of the later portion of the curve illustrated by dotted line 43 and the straight line relaxation plot of the fluid having the shortest relaxation time illustrated by the dot-dashed line 44.

The above description of the manner of analyzing the record on the oscilloscope was based on operating the pulse generator 17 with off times of uniform lengths sufficient to permit time for the nuclei to align themselves with the resultant field, $H_r$. By the above procedure, the signal decay relaxation time is measured. As an alternative, the polarization time may be measured. To measure the polarization time, the pulse generator is adjusted to emit pulses to control the polarization current at intervals varying in a predetermined manner. The duration of each successive off time as controlled by the emitted pulses is greater than the duration of the previous off time by a discrete amount thus reducing the polarization time in the predetermined manner. The signal from the precessing nuclei is picked up by the coil 21, as before, and recorded in the oscillograph. At the end of a very short polarizing pulse from the coil 15, the maximum amplitude of the signal picked up by the coil 21 is not as high as it would be when the magnetic moment in the direction $H_r$ has reached a high value. The longer the pulse is from the polarizing coil 15, the greater will be the maximum amplitude of the voltage recorded on the oscillograph 27. Thus, if a number of records are taken on the oscillograph which result from pulses of varying duration, data can be obtained from which one may plot a graph of maximum signal voltage versus polarizing time. From this graph the thermal relaxation time, $T_1$, can be obtained. This quantity, $T_1$, has the same usefulness in distinguishing water and oil in a formation as does the determination of the relaxation time which is measured after the D.C. power is turned off. The presence of two values of $T_1$ originating from crude oil and formation of water may be determined, and the values of $T_1$ measured in a manner apparent from the method of determining T, set forth above.

The value of $T_1$ can be determined from the slope of a plot on semilog graph paper of variations in signal voltage versus polarizing time. As stated above, the strength of the precessional signal measured instantaneously after the D.C. power has been removed will be determined by the extent of polarization of the nuclei by the polarization field. The extent of polarization will also be effected by the type of molecule with which the nuclei is associated. Different fluids will require different polarization periods to attain the same state of polarization due to the relaxation characteristics of the individual nuclei. A plot of measured signal voltages determined a short time interval after the D.C. polarization power has been removed will display the extent of polarization and, therefore, the relaxation characteristics of the nuclei being investigated. This plot may be in the form of voltage versus polarization time as shown in FIG. 5 with "time" in this plot being similar to the duration of off-time between polarization pulses as stated above rather than time after precession begins. From this plot on semilog paper, the relaxation time $T_1$ may be determined in the same manner as described above. Two separate relaxation times will again be shown by a plotted graph displaying other than a straight line and the separate relaxation times may be determined by extrapolation and subtraction as above.

The quality of the signal recorded on the oscillograph and its usefulness in determining the types of fluids in the formation are dependent in part on the depth to which the D.C. field of the polarizing coil 15 penetrates into the formation. It is important, therefore, that the coil 15 be of such a nature as to provide the maximum penetration consistent with establishing a detectable nuclear magnetic signal. In our apparatus the polarizing coil is a flat, substantially rectangular coil of great length and of the maximum width consistent with bore hole size. Except at positions near the ends of the polarizing coil, the field due to this coil is nearly the same as that produced by two parallel wires of infinite length, i.e., its long dimension is great compared with the diameter of its field of polarization. This field drops off more slowly with distance from the coil than does the field of a circular winding. Our coil permits sampling deeper into the formation and gives a stronger nuclear magnetism signal than a circular winding. The pickup coil has a length along the axis of the well less than the thickness of the thinnest structure that one seeks to identify.

While we have described specific embodiments of our invention, we fully understand that many modifications and variations thereof may be made in the light of the teachings therein presented. We do not intend, therefore, to limit our invention except as set forth in the appended claims.

We claim:

1. The method of detecting the presence of particular hydrogenous fluids in a heterogeneous mixture of a plurality of hydrogenous fluids in an earth formation traversed by a well bore which comprises the steps of establishing a polarization condition of protons in said fluids within and surrounding said well bore, interrupting said polarization condition to permit said protons to precess in phase under the influence of the earth's magnetic field, measuring a characteristic of the relaxation time of said precessing protons within and surrounding said well bore, establishing a different polarization condition of said protons in said fluids within and surrounding the same area of said well bore, interrupting said different polarization condition to permit a second in phase precession of said protons under the influence of the earth's magnetic field, measuring a similar characteristic of the relaxation time of said second proton precession within and surrounding said well bore as a result of said different polarization, repeating said polarization and precession steps for successive different polarizations, measuring similar characteristics for said successive different precession, correlating said characteristics of said successive precessions to establish the relaxation time of said heterogeneous mixture, and determining from said established relaxation time a direct indication of the particular hydrogenous fluids within said heterogeneous mixture.

2. The method of detecting the presence of particular hydrogenous fluids in a heterogeneous mixture of a plurality of hydrogenous fluids in an earth formation traversed by a well bore which comprises the steps of establishing a polarization condition of protons in fluids within and surrounding said well bore, interrupting said polarization condition to permit said protons to precess in-phase under the influence of the earth's magnetic field, measuring a characteristic of the relaxation of said precessing protons within and surrounding said well bore, then establishing at least another different polarization condition of said protons in said fluids, interrupting said different polarization condition to permit a second in-phase precession of said protons under the influence of the earth's magnetic field, measuring a similar characteristic of the relaxation of said protons from said different polarization, and comparing said similar characteristics of said measured relaxations of said hydrogenous fluids to detect variations in the relaxation with variation in polarization as a direct indication of the particular hydrogenous fluids subject to said polarization condition.

3. The method of distinguishing between hydrocarbons and water in situ in an earth formation surrounding a well bore comprising the steps of subjecting the protons of the nuclei of said hydrocarbons and water in said earth formation to a first polarization field, said polarization field being oriented at an angle to the earth's magnetic field within said formation, interrupting said polarization field to permit said polarized protons to precess in the earth's magnetic field, and measuring the amplitude of the signal induced by said precession of said protons; subjecting the protons of the nuclei of said hydrocarbons and water in said earth formation to at least a second polarization field differing in some characteristic from said first polarization field, interrupting said second polarization field to permit said polarized protons to precess in the earth's magnetic field, and measuring the amplitude of the signal induced by said second precession of said protons; and correlating the amplitudes of said measured precessional signals to indicate the thermal relaxation time of said polarized protons and to distinguish between hydrocarbons and water in said earth formation by an indication of more than one thermal relaxation time from said polarized protons.

4. The method of claim 3 wherein said characteristic difference in said polarization field is a difference in polarization field duration.

5. A method of well logging by determining the thermal relaxation time $T_1$ of nuclei possessing the properties of magnetic moment and gyroscopic moment and comprising portions of the formation material in sections of the bore including the steps, performed repetitiously along the length of the well bore, of applying a unidirectional magnetic field to the nuclei in the well bore sections to polarize the nuclei at an angle to the earth's magnetic field, the polarizing magnetic field being applied in a plurality of time spaced pulses, the extent of polarization of the nuclei changing in each stage, said applied unidirectional magnetic field being stronger than and at an angle with respect to the earth's magnetic field, and detecting the free precession of the nuclei in the earth's magnetic field after each stage of polarization, the initial amplitude of each free precession signal varying in accordance with the extent of polarization, the initial amplitudes of these successive free precession signals forming an envelope polarization curve which serves to indicate the thermal relaxation time of the nuclei in the well bore sections.

References Cited in the file of this patent

UNITED STATES PATENTS

| | | |
|---|---|---|
| 2,561,489 | Bloch et al. | July 24, 1951 |
| 2,561,490 | Varian | July 24, 1951 |
| 2,664,542 | Lynn | Dec. 29, 1953 |

OTHER REFERENCES

Hahn, Physical Review, vol. 77, No. 2, Jan. 15, 1950, pp. 297–298.

Torrey, Physical Review, vol. 76, No. 8, Oct. 15, 1949, pp. 1059–1066.

Bloembergen et al., Physical Review, vol. 73, No. 7, Apr. 1, 1948, pp. 679–712.

Hahn, Physics Today, November 1953, pp. 4–9.

Malling, Electronics, June 1954, pp. 134–137.